(12) United States Patent
Hibino

(10) Patent No.: US 8,038,294 B2
(45) Date of Patent: Oct. 18, 2011

(54) CONTACT LENS AND METHOD OF MANUFACTURING THE SAME

(75) Inventor: Shingo Hibino, Kani (JP)

(73) Assignee: Menicon Co., Ltd., Nagoya-shi (JP)

( * ) Notice: Subject to any disclaimer, the term of this patent is extended or adjusted under 35 U.S.C. 154(b) by 291 days.

(21) Appl. No.: 12/312,281

(22) PCT Filed: Nov. 20, 2006

(86) PCT No.: PCT/JP2006/323120
§ 371 (c)(1),
(2), (4) Date: May 4, 2009

(87) PCT Pub. No.: WO2008/062503
PCT Pub. Date: May 29, 2008

(65) Prior Publication Data
US 2010/0060849 A1    Mar. 11, 2010

(51) Int. Cl.
*G02C 7/04* (2006.01)
(52) U.S. Cl. .................................. 351/160 R; 351/161
(58) Field of Classification Search ............. 351/160 R, 351/161–162, 160 H
See application file for complete search history.

(56) References Cited

U.S. PATENT DOCUMENTS

| | | | | |
|---|---|---|---|---|
| 3,781,096 A | * | 12/1973 | Townsley | 351/212 |
| 5,020,898 A | | 6/1991 | Townsley | |
| 5,125,728 A | | 6/1992 | Newman et al. | |
| 5,191,365 A | * | 3/1993 | Stoyan | 351/160 R |
| 5,349,395 A | * | 9/1994 | Stoyan | 351/161 |
| 5,428,412 A | * | 6/1995 | Stoyan | 351/177 |
| 6,113,236 A | | 9/2000 | Chapman et al. | |
| 7,147,325 B2 | | 12/2006 | Gotou et al. | |

(Continued)

FOREIGN PATENT DOCUMENTS
EP    1 496 388 A1    1/2005
(Continued)

OTHER PUBLICATIONS

English Translation of the International Preliminary Report on Patentability for National Phase Application No. PCT/JP2006/323120, mailed Jun. 4, 2009.

(Continued)

*Primary Examiner* — James Greece
(74) *Attorney, Agent, or Firm* — Oliff & Berridge, PLC

(57) ABSTRACT

A novel method for manufacturing a contact lens in which wearing comfort and stability in the circumferential direction that are aimed at can be achieved consistently with a high degree of accuracy irrespective of a profile of an optical zone. An optical zone provided in a center of a lens has a concave rear surface optical zone substantially matching a surface profile of a cornea and has a convex front surface optical zone imparting required spherical diopter power and geometrical center thickness, and a face of either the rear surface optical zone or the front surface optical zone is designed to impart thereto cylindrical power and axial angle required for a toric surface. Furthermore, a junction thickness is established in a joint zone that connects the optical zone with a peripheral zone at multiple sites in a circumferential direction about a geometrical lens center axis of the optical zone. Position of the joint zone is determined on the circumference from profiles established on the rear surface optical zone and the front surface optical zone so as to connect points satisfying the junction thickness thusly established.

6 Claims, 6 Drawing Sheets

U.S. PATENT DOCUMENTS

| | | |
|---|---|---|
| 2003/0103187 A1 | 6/2003 | Miyamura et al. |
| 2007/0159593 A1 | 7/2007 | Hibino et al. |

FOREIGN PATENT DOCUMENTS

| | | |
|---|---|---|
| JP | B2 2695056 | 12/1997 |
| JP | A 2001-519046 | 10/2001 |
| JP | A 2003-228028 | 8/2003 |
| JP | A-2005-148147 | 6/2005 |
| JP | A-2005-202107 | 7/2005 |
| WO | WO 02/48779 A2 | 6/2002 |
| WO | WO 03/087920 A1 | 10/2003 |
| WO | WO 2005/040896 A1 | 5/2005 |

OTHER PUBLICATIONS

Extended European Search Report dated Nov. 18, 2010 for European Application No. EP 06 83 2970.

* cited by examiner

CONTACT LENS AND METHOD OF MANUFACTURING THE SAME

TECHNICAL FIELD

The present invention relates to a contact lens of soft or hard type, and in particular relates to a contact lens of novel design affording excellent wear comfort and stability in the circumferential direction irrespective of the profile of the optical zone; and to a method of manufacturing a contact lens.

BACKGROUND ART

Contact lenses of soft or hard type (hereinbelow collectively designated as "contact lenses") are typically furnished in the center part of the lens with an optical zone that affords certain optical characteristics, and a peripheral zone provided about the circumference of the optical zone, for stabilizing lens shape. The optical zone and the peripheral zone are connected by a joint zone.

In the case of toric contact lenses for correcting astigmatism, it will be necessary to prescribe a lens provided not just with the required spherical diopter power, but also with appropriate cylindrical power and cylindrical axial angle depending on the slope of the astigmatic axis of the wearer. Accordingly, in the case of contact lenses such as those used to correct astigmatism, the optical characteristic of the optical zone will need to be established in a manner inclusive not only of spherical diopter power, but also of elements requiring positioning in the circumferential direction, such as cylindrical power and cylindrical axial angle.

Where the required optical characteristics of contact lenses in the circumferential direction must vary depending on the wearer, the profiles of the optical zone must vary as well. Thus, there will be disparities in the circumferential distribution of a junction thickness in the joint zone. For example, in the case of a toric lens with a cylindrical axial angle of 90°, when worn in the eye the two horizontal edges of the optical zone will be thicker, whereas in the case of a toric lens with a cylindrical axial angle of 180° the two vertical edges of the optical zone will be thicker. Consequently, it will be more difficult to achieve good wear comfort and circumferential stability with a 180° cylindrical axial angle lens as compared with a 90° cylindrical axial angle lens. Further, in the case of a lens having a cylindrical axial angle of 45° for example, irregular torque will tend to arise due to the asymmetrical sideways profile, and circumferential stability will tend to be poor. Thus, for a lens having given spherical diopter power and cylindrical power, appreciable disparities in the circumferential distribution of the junction thickness in the joint zone may arise due, for example, to different cylindrical axial angles. Depending on the individual, such differences may result in the problem of inability to achieve the desired level of wear comfort and circumferential stability. Additionally, as progressively greater levels of cylindrical power are established, the difference in curvature ratio between the optical zone and the peripheral zone will become greater as well, so the joint zone will tend to inflect, which tends to result in diminished wear comfort.

To address such problems, Patent Citation 1 (Japanese PCT Republication No. JP-A-2001-519046) for example discloses a method whereby an appropriate optical zone diameter is selected according to the cylindrical power in order to minimize disparities in thickness dimension among lenses of differing cylindrical power. However, with contact lenses like that taught in Patent Citation 1, disparities in the circumferential location of thickness will arise among lenses with different cylindrical axial angle settings, for example. As noted, differences in circumferential location of thickness have appreciable effect on differences in wear comfort and circumferential stability, and thus with the method taught in Patent Citation 1 there is a risk that, depending on the cylindrical axial angle, inability to achieve the desired level of wear comfort and circumferential stability will be a problem.

Patent Citation 2 (Japanese Patent No. 2695056) discloses a contact lens with reduced inflection of the joint zone by forming within the joint zone a transition portion that affords smooth connection between the optical zone and the peripheral zone. However, the contact lens taught in Patent Citation 2 merely has reduced inflection in the joint zone, and as in Patent Citation 1, such a lens will still entail differences in circumferential location of thickness of the sort discussed previously. Thus, as in Patent Citation 1, with the contact lens of Patent Citation 2, an inability to achieve the desired level of wear comfort and circumferential stability may be a problem.

Further, Patent Citation 3 (U.S. Pat. No. 5,125,728) discloses a contact lens in which an optical zone anterior face and an optical zone posterior face having specific profiles are combined in such a way as to provide improved wear comfort and circumferential stability. However, as in Patent Citations 1 and 2, the contact lens of Patent Citation 3 will still entail differences in circumferential location of thickness arising for disparities in the cylindrical axial angle for example. Thus, depending on the setting location of the cylindrical axial angle, an inability to achieve the desired level of wear comfort and circumferential stability may be a problem.

Patent Citation 1: Japanese PCT Republication No. JP-A-2001-519046
Patent Citation 2: Japanese Pat. No. 2695056
Patent Citation 3: U.S. Pat. No. 5,125,728

DISCLOSURE OF THE INVENTION

Problem the Invention Attempts to Solve

With the foregoing in view, it is accordingly one object of the present invention to provide a novel method of manufacturing a contact lens affording desired wear comfort and stability in the circumferential direction consistently and with a high degree of accuracy, irrespective of the profile of the optical zone.

Yet another object of the present invention is to provide a contact lens series of novel design affording desired wear comfort and stability in the circumferential direction consistently and with a high degree of accuracy, irrespective of differences in optical characteristics among lenses.

Means for Solving the Problem

The modes of the invention directed to attaining the above objects will be described below. The following elements employed in each mode described below may be adopted at any possible optional combination.

Specifically, a first mode of the present invention relates to a method of manufacturing a contact lens including the steps of: providing an optical zone in a center part of the lens; providing a peripheral zone surrounding the optical zone; providing a rear surface optical zone with a concave shape that substantially matches a surface profile of a cornea while providing a front surface optical zone with a convex shape adapted to provide a required spherical diopter power and geometrical center thickness; and designing a face of either the front surface optical zone or the rear surface optical zone so as to impart thereto cylindrical power and axial angle necessary for a toric surface; characterized by comprising further steps of: establishing the junction thickness in a joint zone that connects the optical zone with the peripheral zone at multiple sites in a circumferential direction about a geometrical center axis of the optical zone; and determining a position of the joint zone on the circumference from profiles established on the rear surface optical zone and the front surface optical zone so as to connect points that satisfy the junction thickness thusly established.

According to the manufacturing method of the present mode, the junction thickness in the joint zone is established beforehand, and subsequently the position of the joint zone is determined in such a way as to satisfy the junction thickness, whereby the junction thickness of the joint zone can be set to the desired dimensions with a high degree of accuracy. Thus, excellent wear comfort and stability in the circumferential direction can be attained irrespective of the profile of the optical zone. Specifically, in a toric lens for example, even where spherical diopter power is the same, disparities in the profile of the optical zone will arise if elements such as cylindrical lens power and cylindrical axial angle vary. The inventors discovered that even where such disparities arise, through control of the junction thickness of the joint zone to specific set values excellent wear comfort and stability in the circumferential direction can be achieved nevertheless. According to the manufacturing method of the present mode, it is possible to control the junction thickness of the joint zone to specific set values with a high degree of accuracy, and it is accordingly possible to attain excellent wear comfort and stability in the circumferential direction irrespective of the profile of the optical zone.

The joint zone for which the junction thickness is established according to the present manufacturing method may be either a front surface joint zone formed on the lens front surface and joining the optical zone and the peripheral zone of the lens front surface; or a rear surface joint zone formed on the lens rear surface and joining the optical zone and the peripheral zone of the lens rear surface. Alternatively, using both the front surface and the rear surface, the positions of both the front surface joint zone and the rear surface joint zone could be determined according to the present manufacturing method.

A second mode of the present invention relates to the method of manufacturing a contact lens according to the first mode wherein the junction thickness is established at a minimum of four sites situated at intersection points of latitude lines and longitude lines on the circumference about the geometrical center axis of the optical zone.

According to the manufacturing method of the present mode, by establishing the junction thickness at four sites situated at the top, bottom, left, and right edges, the junction thickness can be set at substantially equal intervals in the circumferential direction of the optical zone, so the junction thickness can be established with good balance in the circumferential direction. Thus, it will be possible to more consistently impart the lens with the desired performance in relation to circumferential stability with respect to the action of gravity and eyelid pressure.

A third mode of the present invention relates to the method of manufacturing a contact lens according to the first or second mode, wherein in contact lenses with a plurality of different optical characteristics and whose optical zones differ in terms of at least cylindrical power and axial angle, the position of the joint zone is determined so as to satisfy the junction thickness established at a plurality of sites in the circumferential direction about the geometrical center axis of the optical zone.

According to the manufacturing method of the present mode, in a plurality of contact lenses with different optical characteristics, the junction thickness of the joint zone in the circumferential direction can be standardized. Thus, where a plurality of contact lenses are provided as a series in which, for example, cylindrical axial angle is established in multiple steps, the circumferential distribution of the junction thickness among different lenses can be made the same irrespective of disparities in optical zone profile due to differences in the cylindrical axial angle, and variability of wear comfort and circumferential stability within a given series can be reduced.

A fourth mode of the present invention relates to the method of manufacturing a contact lens according to any one of the first to third modes, wherein the junction thickness is constant about the entire circumference of the joint zone.

According to the manufacturing method of the present mode, because the junction thickness of the joint zone is constant about the entire circumference irrespective of the profile of the optical zone, difference in the junction thickness in the circumferential direction can be minimized even among lenses with different cylindrical axial angles for example, so that variability of wear comfort and circumferential stability within a given series can be reduced.

A fifth mode of the present invention relates to a method of manufacturing a contact lens according to any one of the first to third modes, wherein the junction thickness is established such that maximum thickness is reached at two points of intersection with a latitude line and minimum thickness is reached at two points of intersection with a longitude line, on the circumference about the geometrical center axis of the optical zone.

According to the manufacturing method of the present mode, with the lens worn in the eye, the upper and lower portions of the joint zone can be thinner while its left and right portions can be thicker. In the present invention in particular, because the thickness dimension of the joint zone can be established with a high degree of accuracy, even where the optical zone has a toric face with a 180° cylindrical axial angle for example (which with conventional manufacturing methods typically means that the joint zone will be thicker at top and bottom), it will be possible for the joint zone to be made thinner at top and bottom. Thus, in a lens that is thinner at the top and bottom of the peripheral zone, such as a contact lens of so-called double slab-off design, the peripheral zone and the optical zone can connect smoothly and wear comfort can be improved. At the same time, by making the left and right portions thicker, the action of gravity will afford a circumferential position stabilizing effect, and circumferential stability will be improved.

A sixth mode of the present invention relates to a method of manufacturing a contact lens according to any one of the first to third modes, wherein the junction thickness is established such that minimum thickness is reached at an upper side point of intersection with a longitude line and maximum thickness is reached at a lower side point of intersection with a longitude line, on the circumference about the geometrical center axis of the optical zone.

According to the manufacturing method of the present mode, with the lens worn in the eye, the upper portion of the joint zone can be thinner, while its lower portion can be thicker. In the present invention in particular, because the thickness dimension of the joint zone can be established with a high degree of accuracy, even where the optical zone has a toric face with a 90° cylindrical axial angle for example (which with conventional manufacturing methods typically means that the joint zone will be thicker at left and right) it will be possible for the joint zone to be made thinner at left and right, thinner at the top portion, and thicker at the bottom portion. Thus, in a lens that is thinner at the top portion and thicker at the bottom portion of the peripheral zone, such as a contact lens of so-called prism ballast design, the peripheral zone and the optical zone can connect smoothly and wear comfort can be improved. At the same time, because the bottom portion of the joint zone is thicker, in conjunction with the thick bottom portion of the peripheral zone, a ballast effect will be afforded more advantageously, and superior circumferential stability can be achieved.

A seventh mode of the present invention relates to the method of manufacturing a contact lens according to any one of the first to sixth modes wherein the junction thickness is established at multiple sites in the circumferential direction about the geometrical center axis of the optical zone; the position of the joint zone is determined so as to satisfy the junction thickness thusly established; and the position of the joint zone between these multiple sites in the circumferential direction is established through an interpolation process.

According to the manufacturing method of the present mode, the number of times that position of the joint zone satisfying the established junction thickness is determined can be reduced, so that the volume of computations needed to derive position of the joint zone can be less and manufacturing efficiency can be improved. It is possible for interpolation processes known in the art to be employed as the interpolation process used in the present manufacturing method of example, Lagrangian interpolation or spline interpolation could be used. In the present mode, no particular limitation is imposed as to the number of positions of the joint zone needing to be determined prior to interpolation; in preferred practice, however, the position of the joint zone will be determined beforehand at a minimum of least four sites, as taught in the second mode.

An eighth mode of the present invention relates to the method of manufacturing a contact lens according to any one of the first to seventh modes, wherein the spherical diopter power required in the optical zone is either a monofocal spherical diopter power, a bifocal spherical diopter power, or a multifocal spherical diopter power.

According to the manufacturing method of the present mode, the thickness dimension of the joint zone can be established with a high degree of accuracy not just in contact lenses with monofocal spherical diopter power, but also in a bifocal lens having two focal points for both near and far vision and used to correct farsightedness; or in a multifocal lens having an even greater number of focal points.

A ninth mode of the present invention relates to a method of manufacturing a contact lens is a method of manufacturing a contact lens according to any one of the first to eighth modes further comprising the steps of: establishing on the rear surface optical zone a base rear surface profile of concave shape that substantially matches the surface profile of the cornea; establishing on the front surface optical zone a base front surface profile of convex shape in view of the base rear surface profile and to the required spherical diopter power and geometrical center thickness; establishing the junction thickness along multiple diametrical axes about the geometrical center axis of the optical zone; and in view of the base rear surface profile and the base front surface profile, and additionally in view of the required cylindrical power and axial angle, deriving a diametrical position of the joint zone that will impart the aforementioned junction thickness along multiple diametrical axes about the geometrical center axis of the optical zone.

According to the manufacturing method of the present mode, diametrical positions of the joint zone that will satisfy the desired junction thickness can be established advantageously, and the junction thickness in the joint zone can be controlled with a high degree of accuracy. Thus, the desired wear comfort and circumferential stability can be achieved irrespective of differences in optical characteristics such as cylindrical power or axial angle.

Another aspect of the present invention relates to a contact lens series provided as a series of multiple combinations of contact lenses that differ from one another in at least the cylindrical power and/or the axial angle in the optical zone, wherein each said contact lens is provided with an optical zone in the center part of the lens and with a peripheral zone surrounding the optical zone; the rear surface optical zone has concave shape that substantially matches the surface profile of the cornea while the front surface optical zone has convex shape adapted to provide the required spherical diopter power and geometrical center thickness; and the face of either the front surface optical zone or the rear surface optical zone is imparted with the cylindrical power and axial angle required of a toric surface; wherein the junction thickness in the joint zone that connects the optical zone with the peripheral zone and established at multiple sites in the circumferential direction about the geometrical center axis of the optical zone is the same in each lens.

In the contact lens series constructed according to the present invention, the junction thickness of the joint zone at prescribed positions in the circumferential direction will be the same in each lens that makes up the series. Thus, the thickness dimension of the joint zone in the circumferential direction can be standardized for lenses of the same series but having different axial angles for example, thereby reducing variability of wear comfort and circumferential stability due to differences in optical characteristics among lenses making up a series so that all of the lenses of the series consistently afford the desired wear comfort and circumferential stability. Consequently, the risk that some wearers in a given series will experience satisfactory wear comfort and circumferential stability while others do not can be reduced.

In the present invention, identical junction thickness in the joint zone means that each lens making up a series will have identical junction thickness at a given specific circumferential position of the joint zone; it does not mean that the junction thickness of the joint zone in a specific contact lens is constant in the circumferential direction. Accordingly, the junction thickness of the joint zone in each contact lens making up a series can either be constant or vary in the circumferential direction.

EXPLANATION OF SYMBOLS

| | |
|---|---|
| 10a | contact lens |
| 10b | contact lens |
| 10c | contact lens |
| 12 | lens center axis |
| 14 | lens front surface |
| 16 | lens rear surface |
| 18 | front surface optical zone |
| 20 | rear surface optical zone |
| 22 | optical zone |
| 24 | peripheral zone |
| 26 | edge zone |
| 28 | front surface peripheral zone |
| 30 | rear surface peripheral zone |
| 32 | front surface joint zone |
| 34 | rear surface joint zone |

BEST MODE FOR CARRYING OUT THE INVENTION

A fuller understanding of the present invention will be provided through the following detailed description of the preferred embodiments of the invention, with reference to the accompanying drawings.

Figure 1A:
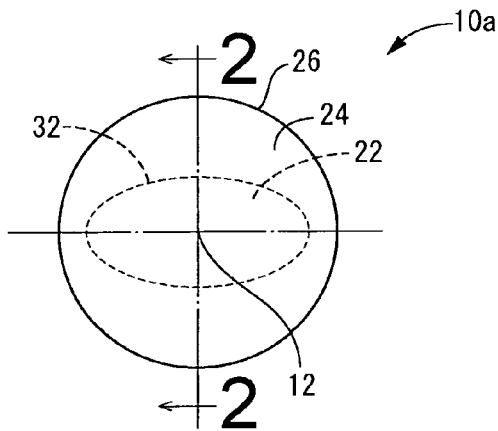
FIGS. 1A-1C are front views depicting contact lenses in a series as a first embodiment of the present invention.
Figure 1B:
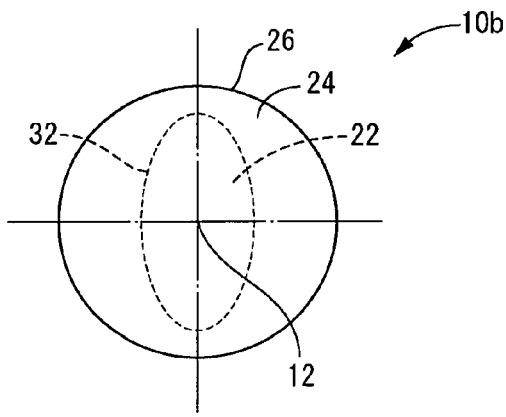
Figure 1C:
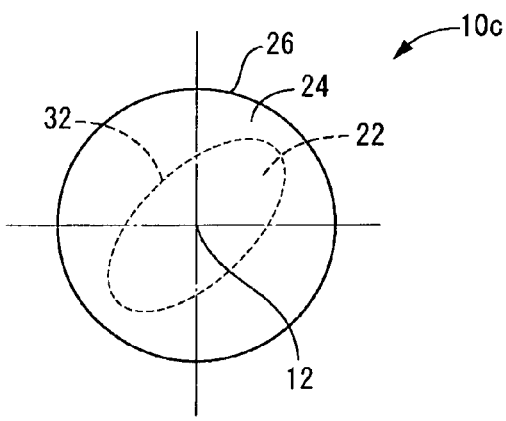

First, FIGS. 1A, 1B and 1C depict a plurality of contact lenses 10a, 10b, 10c selected appropriately from a contact lens series as a first embodiment of the present invention. The series of contact lenses is composed of a combination of several contact lenses whose optical zones 22 (discussed later) have mutually different optical characteristics, e.g. different cylindrical axial angle settings in the case of the present embodiment. Based on an examination of the optical system of the eye of the wearer, the examiner, e.g. an ophthalmologist, will select from the plurality of contact lenses one appropriate lens having optical characteristics appropriate for the wearer, for provision to the wearer.

Figure 2:
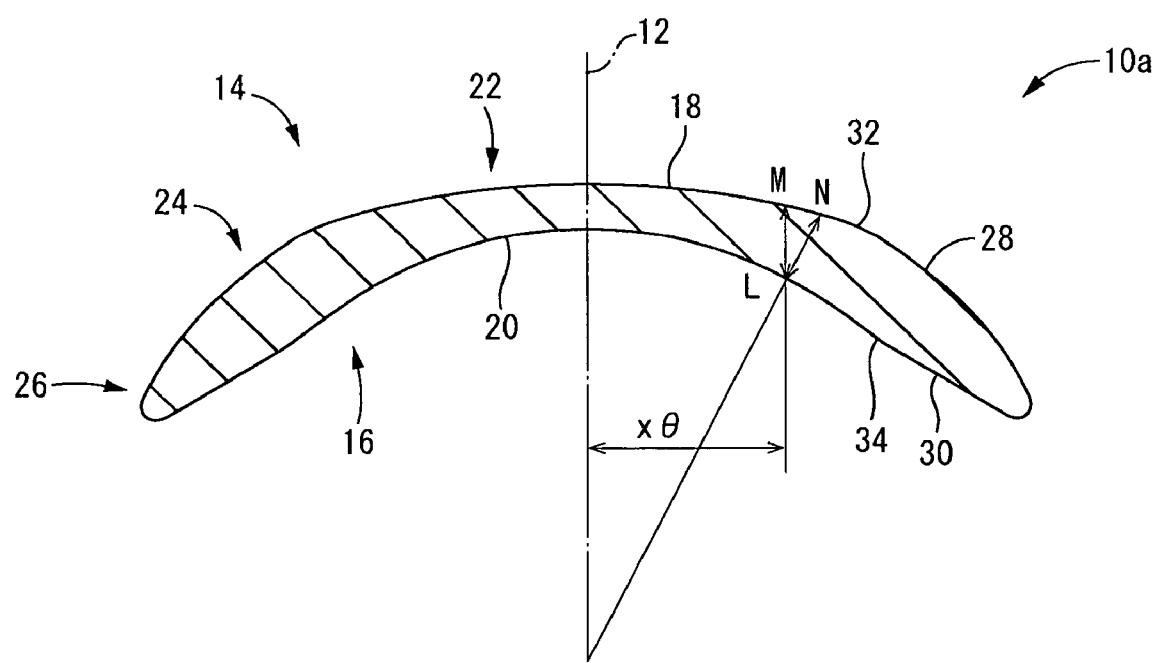
FIG. 2 is a model diagram of the 2-2 cross section in FIG. 1A.

The individual contact lenses 10a, 10b, 10c that are elements making up the contact lens series each have a profile that as a whole resembles a section of a substantially spherical shell. It is commonly understood that the lens will be worn superposed over the surface of the cornea in the eyeball. Here, "wear" refers to use while placed in the human eye. A cross sectional model of contact lens 10a is depicted in FIG. 2. The following description makes reference to FIGS. 1A, 1B, 1C and 2. For the sake of easy understanding, the thickness dimension of the contact lens 10a is depicted in an exaggerated manner, in FIG. 2.

To describe in greater detail, the contact lens 10 (in the absence of the symbol a, b, or c, this refers collectively to a, b and c) is applicable to various kinds of contact lenses of soft type or hard type. For the contact lens 10 there are employed resin materials made from various kinds of polymerizable monomers and having optical characteristics such as light transmissivity, specific examples being hydroxyethyl methacrylate (HEMA), polymethyl methacrylate (PMMA), cellulose acetate butyrate (CAB), silicone copolymers, fluorosilicone acrylate, fluorocarbon polymers, silicone rubber, and the like.

The contact lens 10 has the lens center axis 12 as its optical axis, and as a whole has contours that are rotation-symmetric about the lens center axis 12. In the description below, as a general rule, the diametrical direction of the contact lens 10 refers to the direction of a straight line perpendicular to the lens center axis 12, while the diametrical dimension and width dimension in the diametrical direction refer to dimensions on a line extending in the direction of this straight line (diametrical direction).

The contact lens 10 has a lens front surface 14 with substantially convex spherical contours, and a lens rear surface 16 with substantially concave aspherical contours. In the respective center sections on the lens front and rear surfaces 14, 16, there are formed a front surface optical zone 18 and a rear surface optical zone 20. An optical zone 22 is defined by these front surface optical zone 18 and rear surface optical zone 20. For the front surface optical zone 18, it is possible to employ any profile as the diametrical cross sectional profile, including ones described by multi-order polynomial equations. In the present embodiment in particular, the front surface optical zone 18 has a substantially arcuate cross section of convex with a substantially constant radius of curvature.

The rear surface optical zone 20, on the other hand, has a concave profile that substantially matches the surface profile of the cornea, and employs an aspherical or spherical face of appropriate radius of curvature so as to attain the required optical characteristics (e.g. vision correction function) in cooperation with the front surface optical zone 18. In the present embodiment, in order to impart optical characteristics for astigmatism correction purposes, there is defined on the rear surface optical zone 20 a toric face adapted to exhibit appropriate cylindrical power at an appropriate cylindrical axial angle. The contact lens series of the present embodiment is composed of a number of contact lenses endowed with differing optical characteristics by varying the cylindrical axial angle of their optical zone 22. For instance, of the contact lenses in FIGS. 1A-1C, contact lens 10a has a cylindrical axial angle (Ax) of 180°, contact lens 10b has a cylindrical axial angle (Ax) of 90°, and contact lens 10c has a cylindrical axial angle (Ax) of 45°.

Additionally, in the present embodiment, both the front surface optical zone 18 and the rear surface optical zone 20 in the optical zone 22 are defined with the lens center axis 12 as their geometrical center axis. The geometrical center axis of the optical zone 22 coincides with the lens center axis 12. In the present embodiment in particular, because the front surface optical zone 18 has a substantially constant radius of curvature the optical zone 22 is imparted with monofocal spherical diopter power. However, through appropriate adjustment of the radius of curvature of the front surface optical zone 18, it would be possible to impart bifocal spherical diopter power or multifocal spherical diopter power, for example.

In the outside peripheral section surrounding the optical zone 22, there are formed a peripheral zone 24 and an edge zone 26. The edge zone 26 has annular shape at the outermost peripheral edge portion of the contact lens 10, and in the lens longitudinal cross section has lens front and rear surfaces of chamfered contours extending inwardly from a peripheral edge portion with substantially semicircular contours. The front and rear surfaces of the edge zone 26 connect to front and rear surface peripheral zones 28, 30.

The front surface peripheral zone 28 and the rear surface peripheral zone 30 are of substantially annular shape encircling the front surface optical zone 18 and the rear surface optical zone 20 respectively about the entire circumference; and are situated extending between the edge zone 26 and the front/rear surface optical zones 18, 20 of the contact lens 10. The front and rear surface peripheral zones 28, respectively join at the inside peripheral edge portion to the front and rear surface optical zones 18, 20, with these inside peripheral edge portions constituting front and rear surface joint zones 32, 34 provided as joint zones. Also, the front and rear surface peripheral zones 28, 30 join at the outside peripheral edge portion to the edge zone 26. Thus, the front surface peripheral zone 28 and the rear surface peripheral zone 30 cooperate to define the peripheral zone 24 which is situated to the outside peripheral side of the optical zone 22 of the contact lens 10. In order to achieve better wear comfort, it will be preferable for the lens front and rear surfaces 14, 16 to have smooth contours devoid of inflection points. In preferred practice, the lens front and rear surfaces 14, 16, inclusive of the front and rear surface joint zones 32, 34 which are the joint zones of the optical zone 22 with the peripheral zone 24, will be designed such that the slope angle of a tangent in the diametrical direction varies continuously over substantially the entire face thereof to give a smooth continuous profile devoid of any edge-like inflection point. Consequently, it is not essential that the joint zone of the optical zone 22 with the peripheral zone 24, i.e. the front and rear surface joint zones 32, 34, have line geometry.

particular limitation is imposed thereon. In the contact lens series of the present embodiment, for example, the rear surface optical zone 20 of each lens has a profile that is a combination of a spherical surface with a base curve (BC) equal to 8.6 mm and having a center of curvature on the lens center axis 12, with a cylindrical lens surface having cylindrical power (Cly) of −1.25 D. Furthermore, the front surface optical zone 18 is designed to have a front curve (FC) equal to 9.182 mm with a center of curvature situated on the lens center axis 12, so that with geometrical center thickness (CT) set to equal 0.08 mm, the optical zone 22 will have a principal spherical diopter power (P) equal to −3 D. The contact lens series of the present embodiment is composed of multiple lenses imparted with different optical characteristics by establishing the cylindrical axial angle (Ax) of the optical zone 22 in multiple steps. As mentioned above, of the exemplary contact lenses shown in FIGS. 1A-1C, contact lens 10a has a cylindrical axial angle (Ax) of 180°, contact lens 10b has a cylindrical axial angle (Ax) of 90°, and contact lens 10c has a cylindrical axial angle (Ax) of 45°.

TABLE 1

| BC = 8.60/Po = −3.00/ Ct = 0.08/ Cyl = −1.25/Ax180 | | | | BC = 8.60/Po = −3.00/ Ct = 0.08/Cyl = −1.25/Ax90 | | | | BC = 8.60/Po = −3.00/ Ct = 0.08/ Cyl = −1.25/Ax45 | | | |
|---|---|---|---|---|---|---|---|---|---|---|---|
| θ (deg) | BC θ (mm) | x θ (mm) | JT θ (mm) | θ (deg) | BC θ (mm) | x θ (mm) | JT θ (mm) | θ (deg) | BC θ (mm) | x θ (mm) | JT θ (mm) |
| 0 | 8.387 | 3.76 | 0.150 | 0 | 8.600 | 4.49 | 0.150 | 0 | 8.492 | 4.08 | 0.150 |
| 10 | 8.393 | 3.77 | 0.150 | 10 | 8.593 | 4.46 | 0.150 | 10 | 8.529 | 4.20 | 0.150 |
| 20 | 8.411 | 3.82 | 0.150 | 20 | 8.575 | 4.38 | 0.150 | 20 | 8.561 | 4.33 | 0.150 |
| 30 | 8.439 | 3.91 | 0.150 | 30 | 8.546 | 4.27 | 0.150 | 30 | 8.585 | 4.43 | 0.150 |
| 40 | 8.474 | 4.01 | 0.150 | 40 | 8.511 | 4.14 | 0.150 | 40 | 8.598 | 4.48 | 0.150 |
| 50 | 8.511 | 4.14 | 0.150 | 50 | 8.474 | 4.01 | 0.150 | 50 | 8.598 | 4.48 | 0.150 |
| 60 | 8.546 | 4.27 | 0.150 | 60 | 8.439 | 3.91 | 0.150 | 60 | 8.585 | 4.43 | 0.150 |
| 70 | 8.575 | 4.38 | 0.150 | 70 | 8.411 | 3.82 | 0.150 | 70 | 8.561 | 4.33 | 0.150 |
| 80 | 8.593 | 4.46 | 0.150 | 80 | 8.393 | 3.77 | 0.150 | 80 | 8.529 | 4.20 | 0.150 |
| 90 | 8.600 | 4.49 | 0.150 | 90 | 8.387 | 3.76 | 0.150 | 90 | 8.492 | 4.08 | 0.150 |
| 100 | 8.593 | 4.46 | 0.150 | 100 | 8.393 | 3.77 | 0.150 | 100 | 8.456 | 3.96 | 0.150 |
| 110 | 8.575 | 4.38 | 0.150 | 110 | 8.411 | 3.82 | 0.150 | 110 | 8.424 | 3.86 | 0.150 |
| 120 | 8.546 | 4.27 | 0.150 | 120 | 8.439 | 3.91 | 0.150 | 120 | 8.401 | 3.80 | 0.150 |
| 130 | 8.511 | 4.14 | 0.150 | 130 | 8.474 | 4.01 | 0.150 | 130 | 8.388 | 3.76 | 0.150 |
| 140 | 8.474 | 4.01 | 0.150 | 140 | 8.511 | 4.14 | 0.150 | 140 | 8.388 | 3.76 | 0.150 |
| 150 | 8.439 | 3.91 | 0.150 | 150 | 8.546 | 4.27 | 0.150 | 150 | 8.401 | 3.80 | 0.150 |
| 160 | 8.411 | 3.82 | 0.150 | 160 | 8.575 | 4.38 | 0.150 | 160 | 8.424 | 3.86 | 0.150 |
| 170 | 8.393 | 3.77 | 0.150 | 170 | 8.593 | 4.46 | 0.150 | 170 | 8.456 | 3.96 | 0.150 |
| 180 | 8.387 | 3.76 | 0.150 | 180 | 8.600 | 4.49 | 0.150 | 180 | 8.492 | 4.08 | 0.150 |
| 190 | 8.393 | 3.77 | 0.150 | 190 | 8.593 | 4.46 | 0.150 | 190 | 8.529 | 4.20 | 0.150 |
| 200 | 8.111 | 3.82 | 0.150 | 200 | 8.575 | 4.38 | 0.150 | 200 | 8.561 | 4.33 | 0.150 |
| 210 | 8.439 | 3.91 | 0.150 | 210 | 8.546 | 4.27 | 0.150 | 210 | 8.585 | 4.43 | 0.150 |
| 220 | 8.474 | 4.01 | 0.150 | 220 | 8.511 | 4.14 | 0.150 | 220 | 8.598 | 4.48 | 0.150 |
| 230 | 8.511 | 4.14 | 0.150 | 230 | 8.474 | 4.01 | 0.150 | 230 | 8.598 | 4.48 | 0.150 |
| 240 | 8.546 | 4.27 | 0.150 | 240 | 8.439 | 3.91 | 0.150 | 240 | 8.585 | 4.43 | 0.150 |
| 250 | 8.575 | 4.38 | 0.150 | 250 | 8.411 | 3.82 | 0.150 | 250 | 8.561 | 4.33 | 0.150 |
| 260 | 8.593 | 4.46 | 0.150 | 260 | 8.393 | 3.77 | 0.150 | 260 | 8.529 | 4.20 | 0.150 |
| 270 | 8.600 | 4.49 | 0.150 | 270 | 8.387 | 3.76 | 0.150 | 270 | 8.492 | 4.08 | 0.150 |
| 280 | 8.593 | 4.46 | 0.150 | 280 | 8.393 | 3.77 | 0.150 | 280 | 8.456 | 3.96 | 0.150 |
| 290 | 8.575 | 4.38 | 0.150 | 290 | 8.411 | 3.82 | 0.150 | 290 | 8.424 | 3.86 | 0.150 |
| 300 | 8.546 | 4.27 | 0.150 | 300 | 8.439 | 3.91 | 0.150 | 300 | 8.401 | 3.80 | 0.150 |
| 310 | 8.511 | 4.14 | 0.150 | 310 | 8.474 | 4.01 | 0.150 | 310 | 8.388 | 3.76 | 0.150 |
| 320 | 8.474 | 4.01 | 0.150 | 320 | 8.511 | 4.14 | 0.150 | 320 | 8.388 | 3.76 | 0.150 |
| 330 | 8.439 | 3.91 | 0.150 | 330 | 8.546 | 4.27 | 0.150 | 330 | 8.401 | 3.80 | 0.150 |
| 340 | 8.411 | 3.82 | 0.150 | 340 | 8.575 | 4.38 | 0.150 | 340 | 8.424 | 3.86 | 0.150 |
| 350 | 8.393 | 3.77 | 0.150 | 350 | 8.593 | 4.46 | 0.150 | 350 | 8.456 | 3.96 | 0.150 |
| 360 | 8.387 | 3.76 | 0.150 | 360 | 8.600 | 4.49 | 0.150 | 360 | 8.492 | 4.08 | 0.150 |

Figure 3:
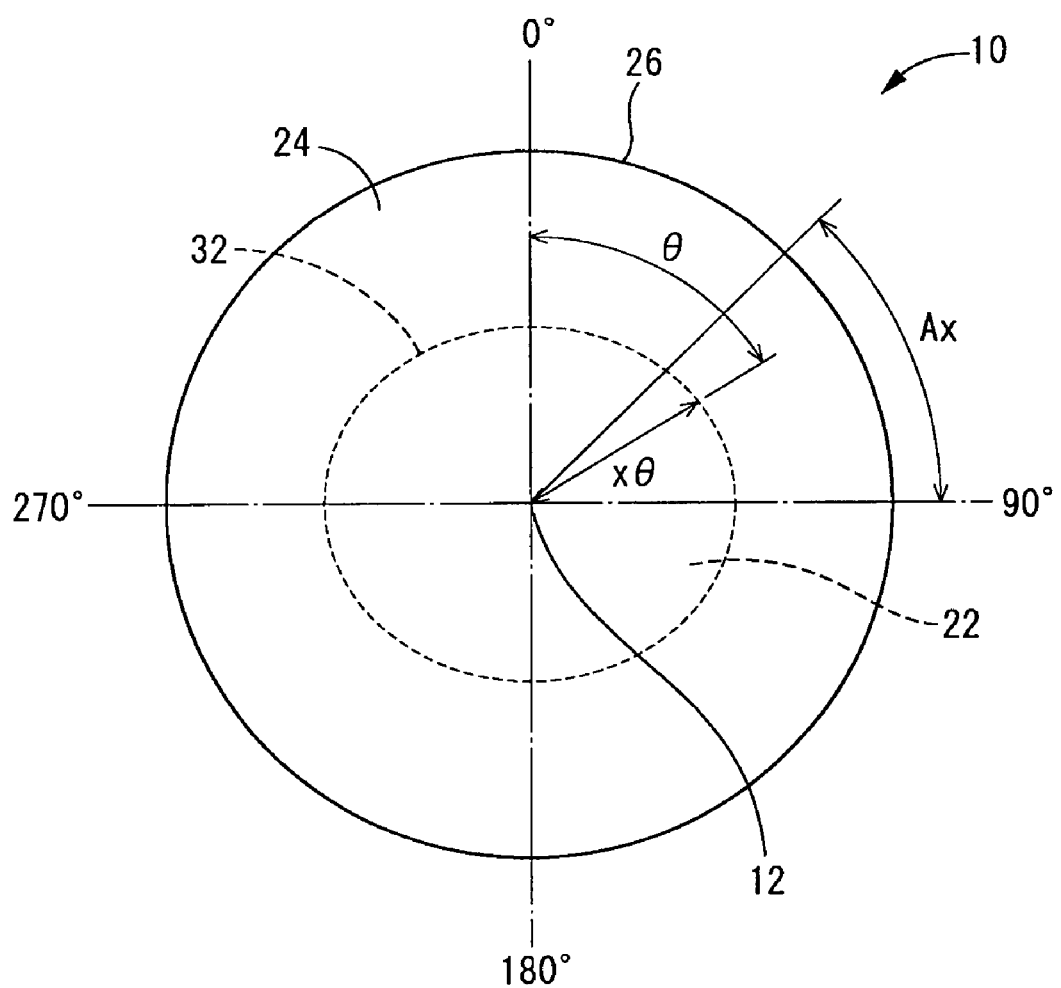
FIG. 3 is an illustration showing angle direction (θ) and radial dimension (xθ) in the present invention.

The optical characteristics of the optical zone 22 and the specific dimension and profile of the front and rear surface optical zones 18, 20 for imparting the same will be determined appropriately in consideration of the size and shape of the wearer's cornea, pupil, eyelid, and other regions, and no In the contact lens series of the present embodiment in particular, the junction thickness, i.e. the thickness dimension of the rear surface joint zone 34, is made constant about the entire circumference by adjusting the setting of the radial dimension of the rear surface optical zone 20 which constitutes part of the optical zone 22. Each lens making up the series will have identical thickness dimension in a prescribed angular direction (θ) about the lens center axis 12 of the rear surface joint zone 34. Table 1 shows thickness dimension in the rear surface joint zone 34 of each of the exemplary lenses depicted in FIGS. 1A-1C, in each of a number of angular directions in the circumferential direction. In Table 1 and in Tables 2-4 to be discussed later, as shown in FIG. 3, θ denotes the angle of rotation about the lens center axis 12 where the zenithal portion of the lens during wear is assigned 0°; and BCA denotes the radius of curvature of the rear surface optical zone 20 at this angular direction θ. xθ denotes planar distance from the lens center axis 12 of the rear surface optical zone 20 at this angular direction θ; in the present embodiment, xθ represents the radius of the optical zone 22. JTθ denotes the junction thickness, i.e. thickness dimension of the rear surface joint zone 34, at the angular direction (θ). In the present invention, JTθ can be either thickness dimension in the axial direction extending parallel to the lens center axis 12, (LM in FIG. 2) or thickness dimension in the radial direction (LN in FIG. 2); in the present embodiment, thickness dimension in the radial direction is employed.

As will be appreciated from Table 1, in the respective contact lenses 10a, 10b, 10c which are part of the series in the present embodiment, the thickness dimension of the rear surface joint zone 34 is a constant thickness dimension (0.15 mm) about the entire circumference. Also, the thickness dimension (JTθ) in the prescribed angular direction (θ) is the same in each of the lenses 10a, 10b, 10c.

As will be appreciated from the above, the contact lenses 10 that make up the series in the present embodiment have constant thickness dimension about the entire circumference in the rear surface joint zone 34 between the optical zone 22 and the peripheral zone 24. Consequently, irrespective of optical characteristics such as the cylindrical axial angle of the optical zone 22, it will be possible to establish the thickness dimension of the joint zone with a high degree of accuracy and to obtain the desired wear comfort and circumferential stability consistently and with a high degree of accuracy. In the present embodiment in particular, even in a contact lens 10a having a cylindrical axial angle of 180° (which in conventional designs meant that the lens is thick at top and bottom and has difficulty attaining good circumferential stability), dimensions at the top and bottom can be made thinner and excellent circumferential stability can be achieved. Moreover, even in a contact lens 10c having a cylindrical axial angle of 45° (which is prone to rotating during wear due to nonuniform thickness location in the circumferential direction), thickness in the circumferential direction can be made constant, unwanted torque can be prevented from occurring, and excellent circumferential stability can be achieved.

In the contact lens series of the present embodiment which includes these contact lenses 10a, 10b, 10c, the lenses all have identical thickness dimension of the joint zone in a prescribed angular direction, and thus variability in wear comfort and circumferential stability among lenses can be reduced, and the desired wear comfort and circumferential stability can be attained consistently throughout the series.

The description now turns to a specific example of an advantageous manufacturing method of the contact lens 10 of the present embodiment constructed as described above.

First, with consideration to the profile of the cornea, a radius of curvature (BC) serving as a base for the rear surface optical zone 20 is set to an appropriate value. At the same time, the principal spherical diopter power (P) and the geometrical center thickness (CT) of the contact lens 10 will be set to appropriate values.

Next, the radius of curvature of the front surface optical zone 18 will be established so as to attain the desired principal spherical diopter power (P) while satisfying the base radius of curvature (BC) and the geometrical center thickness (CT) that were previously established for the rear surface optical zone 20. Conventional known methods, such as a ray tracing algorithm for example, may be used to calculate a radius of curvature for the front surface optical zone 18 that will satisfy these conditions; such calculation by ray tracing algorithm may be advantageously carried out using a commercially available optical design software package.

Figure 4:
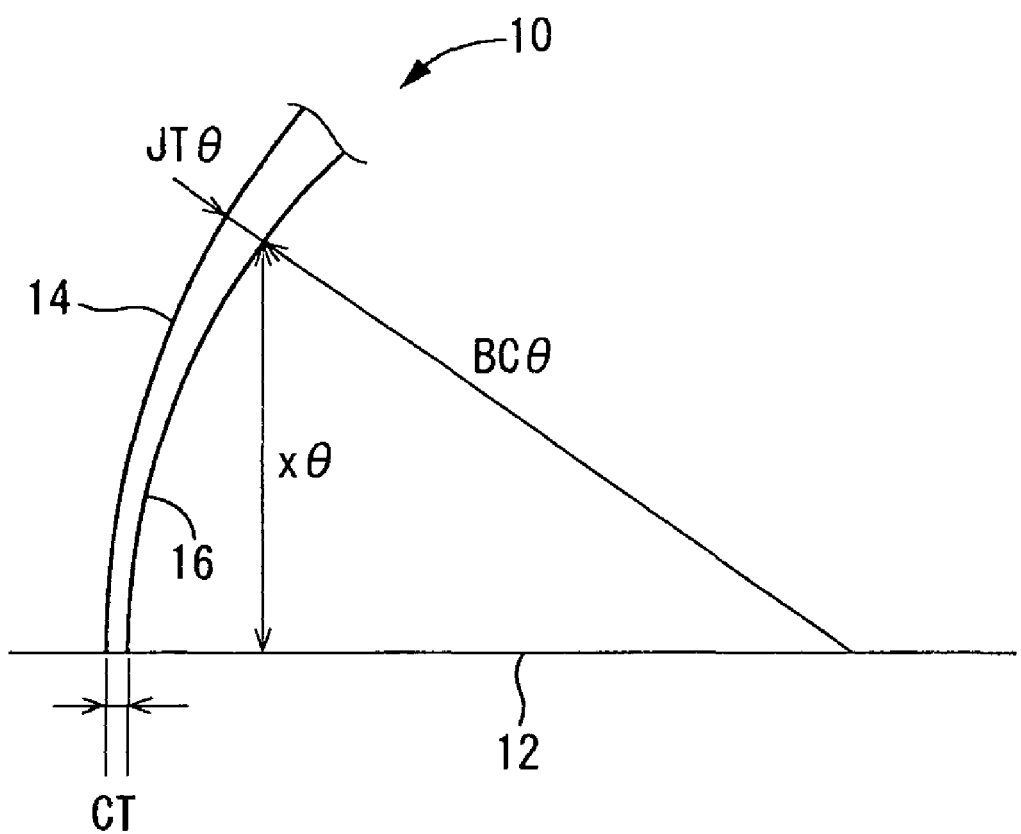
FIG. 4 is an illustration showing a method of determining radial dimension (xθ) in the present invention.
Figure 5:
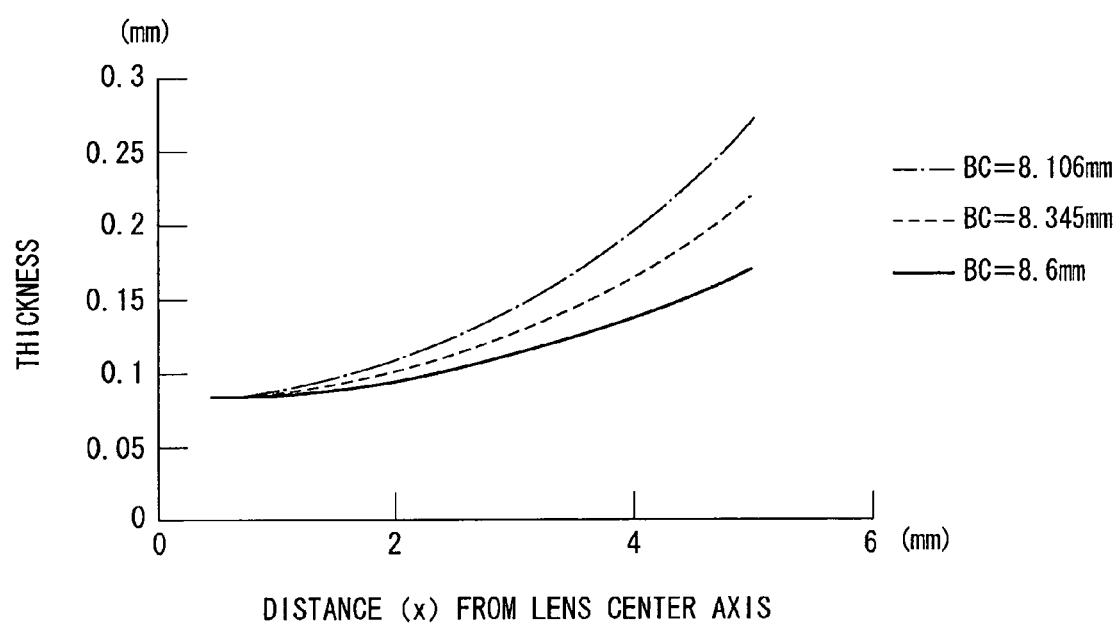
FIG. 5 is a graph depicting variation of thickness dimension in individual rear surface curvature radii (BC).

Next, a number of appropriate angular directions (θ) about the lens center axis 12 will be selected, and a radius of curvature of the rear surface optical zone 20 in these angular directions (θ) will be established so as to give a desired cylindrical power and cylindrical axial angle. As with the front surface optical zone 18 discussed previously, the radius of curvature for the rear surface optical zone 20 can be calculated using a ray tracing algorithm of a commercially available optical design software package. While no particular limitation is imposed on the angular directions selected at this time, in preferred practice they will include at a minimum the four angles 0°, 90°, 180°, and 270° situated at points of intersection with latitude lines and longitude, lines on the circumference about the lens center axis 12 of the optical zone 22. By so doing, because the respective curve radii for the rear surface optical zone 20 and the front surface optical zone 18 are determined at the selected angular directions, thickness of the optical zone 22 can be varied according to separation distance from the lens center axis 12 in these angular directions as depicted in FIG. 4. For example, where the base radius of curvature (BC) of the rear surface optical zone 20 equals 8.6 mm, at the cylindrical curvature ratio of 8.345 mm associated with cylindrical power of −1.5 D or at the cylindrical curvature ratio of 8.106 mm associated with cylindrical power of −3 D for example, the thickness of the optical zone 22 having front surface spherical diopter power of −3 D will vary in the manner indicated in FIG. 5, in association with change in separation distance (x) in the diametrical direction from the lens center axis 12.

Next, the thickness dimension of the rear surface joint zone 34 in the selected angular directions will be set to the desired dimension. For example, the thickness dimension of the rear surface joint zone 34 may be set to a constant value along the entire circumference about the lens center axis 12. The radius (xθ) of the optical zone 22 of the established thickness dimension can then be derived on the basis of this thickness variation of the optical zone 22, because thickness dimensions at locations situated a prescribed separation distance away from the lens center axis 12 have already been derived based on the variation in thickness of the optical zone 22 derived in the above manner and depicted by way of example in FIG. 5. For example, because optical zone radius is typically set to between 3 mm and 5 mm, in FIG. 5, where the radius of curvature (BC) is 8.6 mm and the front surface spherical diopter power is −3 D, the junction thickness will be set to between approximately 0.11 and 0.17 mm.

The radius (xθ) of the optical zone 22 will be calculated in this manner for all of the selected angular directions (θ). The radius (xθ) of the optical zone 22 between selected angular directions can advantageously be calculated using conventional known interpolation processes such as Lagrangian interpolation or spline interpolation. It will be possible thereby to derive along the entire circumference of the lens a radius (xθ) of the optical zone 22 that satisfies the desired thickness dimension of the rear surface joint zone 34.

In preferred practice the peripheral zone 24 will be imparted with contours that connect smoothly with the optical zone 22; and the front surface peripheral zone 28 and the rear surface peripheral zone 30 will be established employing a function or arbitrary curve such that they connect smoothly with the front surface optical zone 18 and with the rear surface optical zone 20 respectively.

The desired contact lens 10 can be obtained in the above manner. Where such contact lenses are to be provided in a series, a number of contact lenses having identical spherical diopter power and cylindrical power but different cylindrical axial angles may be prepared to make up a series composed of these contact lenses, for example.

According to the manufacturing method herein, the thickness dimension of the rear surface joint zone 34 which joins the optical zone 22 with the peripheral zone 24 can be set to desired dimensions with a high degree of accuracy. Accordingly, it will be possible for example for the rear surface joint zone 34 to have constant thickness dimension about the entire circumference as described earlier, so that in a contact lens having a cylindrical axial angle of 180° it will be possible for the thickness dimension at top and bottom to be equal to that of other regions, rather than being thicker at top and bottom as in the prior art. Additionally, even in a contact lens having a cylindrical axial angle of 45° (which in the prior art meant that the left and right sides would have different circumferential distribution of thickness of the joint zone) joint zone thickness can be made constant about the entire circumference. In this way, according to the manufacturing method herein, irrespective of cylindrical axial angle desired thickness dimensions can be obtained with a high degree of accuracy, and outstanding wear comfort and circumferential stability may be achieved.

Moreover, according to the manufacturing method herein, where contact lenses are provided in a series composed of several contact lenses whose cylindrical axial angle is established in multiple steps, by establishing the thickness dimension of the rear surface joint zone 34 with a high degree of accuracy, equal circumferential distribution of thickness of the rear surface joint zone 34 at any cylindrical axial angle can be achieved. Thus, variability of wear comfort and circumferential stability due to differences in cylindrical axial angle within a given series can be minimized, and the desired wear comfort and circumferential stability can be achieved consistently and with high accuracy throughout all of the contact lenses that make up a series.

In the manufacturing method described above, diameter dimensions for rear surface optical zone 20 selected so as to achieve the desired thickness dimension are first calculated in certain prescribed angular directions in the rear surface joint zone 34 (in the above manufacturing method of example, at four locations of 0°, 90°, 180°, and 270°), and diameter dimensions in other angular directions are then calculated by an interpolation process. However, it would be acceptable to instead calculate diameter dimensions of the rear surface optical zone 20 about the entire circumference by using a computer or the like to calculate diameter dimensions in a multitude of angular directions small increments apart (e.g. 1° or 0.5°) in the circumferential direction of the rear surface joint zone 34. Yet another method of establishing desired thickness dimensions in prescribed angular directions in the rear surface joint zone 34 would be to establish desired thickness dimensions at multiple points separated by appropriate distances in the circumferential direction in the rear surface joint zone 34, and to then establish thickness dimensions at locations between these multiple points in the circumferential direction using a known interpolation process such as Lagrangian interpolation or spline interpolation. With this arrangement, variation in thickness of the rear surface joint zone 34 in the circumferential direction can be smoothed out.

Figure 6A:
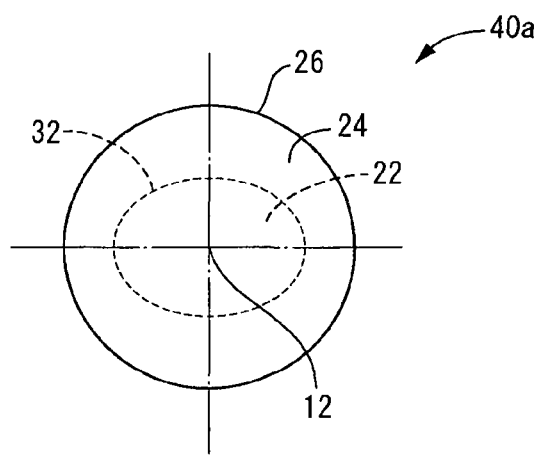
FIGS. 6A-6C are front views depicting contact lenses in a series as a second embodiment of the present invention.
Figure 6B:
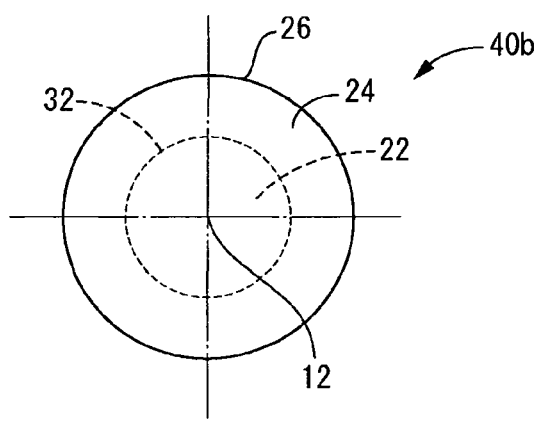
Figure 6C:
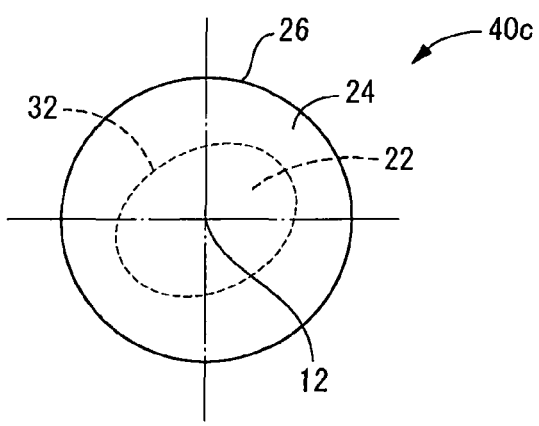

Next, FIGS. 6A, 6B and 6C depict a plurality of contact lenses 40a, 40b, 40c selected appropriately from a contact lens series in a second embodiment of the present invention. These contact lenses 40a, 40b, 40c, like those of the first embodiment, make up a series of contact lenses combining lenses whose optical zones have mutually different optical characteristics (e.g. different cylindrical axial angle). In FIGS. 6A-6C, parts of structure comparable to those in the preceding first embodiment are assigned the same symbols in the drawing as in the first embodiment, and are not discussed in any detail.

The series contact lenses 40 (in the absence of the symbol a, b, or c, refers collectively to a, b and c) in the present embodiment have generally similar construction to the contact lenses 10 in the preceding first embodiment. Specifically, the optical zone 22 has a profile that is a combination of a spherical surface with a base curve (BC) equal to 8.6 mm and having a center of curvature on the lens center axis 12, with a cylindrical lens surface having cylindrical power (Cly) of −1.25 D. Furthermore, the front surface optical zone 18 is designed to have a front curve (FC) equal to 9.182 mm with a center of curvature situated on the lens center axis 12, so that with geometrical center thickness (CT) set to equal 0.08 mm the optical zone 22 will have a principal spherical diopter power (P) equal to −3 D. The contact lens series of the present embodiment is composed of multiple lenses imparted with different optical characteristics by establishing the cylindrical axial angle (Ax) of the optical zone 22 in multiple steps; contact lens 40a has a cylindrical axial angle (Ax) of 180°, contact lens 40b has a cylindrical axial angle (Ax) of 90°, and contact lens 40c has a cylindrical axial angle (Ax) of 45°.

TABLE 2

| BC = 8.60/Po = −3.00/ Ct = 0.08/ Cyl = −1.25/Ax180 | | | | BC = 8.60/Po = −3.00/ Ct = 0.08/Cyl = −1.25/Ax90 | | | | BC = 8.60/Po = −3.00/ Ct = 0.08/ Cyl = −1.25/Ax45 | | | |
|---|---|---|---|---|---|---|---|---|---|---|---|
| θ (deg) | BCθ (mm) | xθ (mm) | JTθ (mm) | θ (deg) | BCθ (mm) | xθ (mm) | JTθ (mm) | θ (deg) | BCθ (mm) | xθ (mm) | JTθ (mm) |
| 0 | 8.387 | 3.20 | 0.130 | 0 | 8.600 | 3.84 | 0.130 | 0 | 8.492 | 3.48 | 0.130 |
| 10 | 8.393 | 3.24 | 0.131 | 10 | 8.593 | 3.84 | 0.131 | 10 | 8.529 | 3.61 | 0.131 |
| 20 | 8.411 | 3.33 | 0.133 | 20 | 8.575 | 3.83 | 0.133 | 20 | 8.581 | 3.78 | 0.133 |
| 30 | 8.439 | 3.49 | 0.135 | 30 | 8.546 | 3.81 | 0.135 | 30 | 8.585 | 3.96 | 0.135 |
| 40 | 8.474 | 3.68 | 0.138 | 40 | 8.511 | 3.80 | 0.138 | 40 | 8.598 | 4.12 | 0.138 |
| 50 | 8.511 | 3.90 | 0.142 | 50 | 8.474 | 3.78 | 0.142 | 50 | 8.598 | 4.23 | 0.142 |
| 60 | 8.546 | 4.12 | 0.145 | 60 | 8.439 | 3.77 | 0.145 | 60 | 8.585 | 4.28 | 0.145 |
| 70 | 8.575 | 4.31 | 0.148 | 70 | 8.411 | 3.76 | 0.148 | 70 | 8.561 | 4.26 | 0.148 |

TABLE 2-continued

| BC = 8.60/Po = −3.00/ Ct = 0.08/ Cyl = −1.25/Ax180 | | | | BC = 8.60/Po = −3.00/ Ct = 0.08/Cyl = −1.25/Ax90 | | | | BC = 8.60/Po = −3.00/ Ct = 0.08/ Cyl = −1.25/Ax45 | | | |
|---|---|---|---|---|---|---|---|---|---|---|---|
| θ (deg) | BC θ (mm) | x θ (mm) | JT θ (mm) | θ (deg) | BC θ (mm) | x θ (mm) | JT θ (mm) | θ (deg) | BC θ (mm) | x θ (mm) | JT θ (mm) |
| 80 | 8.593 | 4.44 | 0.150 | 80 | 8.393 | 3.76 | 0.150 | 80 | 8.629 | 4.19 | 0.150 |
| 90 | 8.600 | 4.49 | 0.150 | 90 | 8.387 | 3.76 | 0.150 | 90 | 8.492 | 4.08 | 0.150 |
| 100 | 8.593 | 4.44 | 0.150 | 100 | 8.393 | 3.76 | 0.150 | 100 | 8.456 | 3.94 | 0.150 |
| 110 | 8.575 | 4.31 | 0.148 | 110 | 8.411 | 3.76 | 0.148 | 110 | 8.424 | 3.80 | 0.148 |
| 120 | 8.546 | 4.12 | 0.145 | 120 | 8.439 | 3.77 | 0.145 | 120 | 8.401 | 3.67 | 0.145 |
| 130 | 8.511 | 3.90 | 0.142 | 130 | 8.474 | 3.78 | 0.142 | 130 | 8.388 | 3.54 | 0.142 |
| 140 | 8.474 | 3.68 | 0.138 | 140 | 8.511 | 3.80 | 0.138 | 140 | 8.388 | 3.45 | 0.138 |
| 150 | 8.439 | 3.49 | 0.135 | 150 | 8.546 | 3.81 | 0.135 | 150 | 8.401 | 3.39 | 0.135 |
| 160 | 8.411 | 3.33 | 0.133 | 160 | 8.575 | 3.83 | 0.133 | 160 | 8.424 | 3.37 | 0.133 |
| 170 | 8.393 | 3.24 | 0.131 | 170 | 8.593 | 3.84 | 0.131 | 170 | 8.456 | 3.40 | 0.131 |
| 180 | 8.387 | 3.20 | 0.130 | 180 | 8.600 | 3.84 | 0.130 | 180 | 8.492 | 3.48 | 0.130 |
| 190 | 8.393 | 3.24 | 0.131 | 190 | 8.593 | 3.84 | 0.131 | 190 | 8.529 | 3.61 | 0.131 |
| 200 | 8.411 | 3.33 | 0.133 | 200 | 8.575 | 3.83 | 0.133 | 200 | 8.561 | 3.78 | 0.133 |
| 210 | 8.439 | 3.49 | 0.135 | 210 | 8.546 | 3.81 | 0.135 | 210 | 8.585 | 3.96 | 0.135 |
| 220 | 8.474 | 3.68 | 0.138 | 220 | 8.511 | 3.80 | 0.138 | 220 | 8.598 | 4.12 | 0.138 |
| 230 | 8.511 | 3.90 | 0.142 | 230 | 8.474 | 3.78 | 0.142 | 230 | 8.598 | 4.23 | 0.142 |
| 240 | 8.546 | 4.12 | 0.145 | 240 | 8.439 | 3.77 | 0.145 | 240 | 8.595 | 4.28 | 0.145 |
| 250 | 8.575 | 4.31 | 0.148 | 250 | 8.411 | 3.76 | 0.148 | 250 | 8.561 | 4.26 | 0.148 |
| 260 | 8.593 | 4.44 | 0.150 | 260 | 8.393 | 3.76 | 0.150 | 260 | 8.529 | 4.19 | 0.150 |
| 270 | 8.600 | 4.49 | 0.150 | 270 | 8.387 | 3.76 | 0.150 | 270 | 8.492 | 4.08 | 0.150 |
| 280 | 8.593 | 4.44 | 0.150 | 280 | 8.393 | 3.76 | 0.150 | 280 | 8.456 | 3.94 | 0.150 |
| 290 | 8.575 | 4.31 | 0.148 | 290 | 8.411 | 3.76 | 0.148 | 290 | 8.424 | 3.80 | 0.148 |
| 300 | 8.546 | 4.12 | 0.145 | 300 | 8.439 | 3.77 | 0.145 | 300 | 8.401 | 3.67 | 0.145 |
| 310 | 8.511 | 3.90 | 0.142 | 310 | 8.474 | 3.78 | 0.142 | 310 | 8.388 | 3.54 | 0.142 |
| 320 | 8.474 | 3.68 | 0.138 | 320 | 8.511 | 3.80 | 0.138 | 320 | 8.388 | 3.45 | 0.138 |
| 330 | 8.439 | 3.49 | 0.135 | 330 | 8.546 | 3.81 | 0.135 | 330 | 8.401 | 3.39 | 0.135 |
| 340 | 8.411 | 3.33 | 0.133 | 340 | 8.575 | 3.83 | 0.133 | 340 | 8.424 | 3.37 | 0.133 |
| 350 | 8.393 | 3.24 | 0.131 | 350 | 8.593 | 3.84 | 0.131 | 350 | 8.456 | 3.40 | 0.131 |
| 360 | 8.387 | 3.20 | 0.130 | 360 | 8.600 | 3.84 | 0.130 | 360 | 8.492 | 3.48 | 0.130 |

Table 2 shows thickness dimension in the rear surface joint zone 34 of each of the contact lenses 40a, 40b, 40c of the present embodiment, in each of a number of angular directions in the circumferential direction. As will be appreciated from Table 2, in contrast to the contact lenses 10 of the preceding first embodiment, in the contact lenses 40a, 40b, 40c of the present embodiment thickness dimension of the rear surface joint zone 34 varies in the circumferential direction with the lens center axis 12 as the center of rotation. To describe in greater detail, the thickness dimension of the rear surface joint zone 34 in each contact lens 40 is thinnest (JT(θ)=0.130 mm) in the angular directions (θ)=0° and 180° representing the two intersection points with a longitude line on the circumference of the optical zone 22, and is thickest (JT(θ)=0.150 mm) in the angular directions 90° and 270° representing the two intersection points with a latitude line. Thickness dimension in the rear surface joint zone 34 varies in the circumferential direction with a periodicity π such that the angular directions of these angular directions 0°, 90°, 180°, 270° connect smoothly.

While no particular limitation is imposed here as to the specific shape of the peripheral zone 24, in the present embodiment in particular, the peripheral zone 24 is formed such that, when worn in the eye, the regions at top and bottom (i.e. regions lying in angular directions 0° and)180° will be thinnest and the regions at left and right (i.e. regions lying in angular directions 90° and)270° will be thickest. Thus, the contact lenses 40 of the present embodiment are contact lens whose peripheral zone 24 is formed with the so-called double slab-off design.

As will be understood from Table 2, in each of the contact lenses 40a, b, c that make up the series in the present embodiment, thickness dimension JT(θ) of the rear surface joint zone 34 in a prescribed angular direction (θ) will be the same. That is, in each of the contact lenses 40a, 40b, 40c thickness dimension JT(θ) in a specific angular direction (θ) of 30° for example will be 0.135 mm; and in each of the contact lenses 40a, 40b, 40c thickness dimension JT(θ) in a specific angular direction (θ) of 230° will be 0.142 mm. In this way, in the contact lens series of the present embodiment, irrespective of the cylindrical axial angle setting, in each lens the regions at top and bottom of the optical zone 22 will be thinnest while the regions at left and right will be thickest. Moreover, the thickness dimension of the rear surface joint zone 34 in the circumferential direction about the lens center axis 12 will be equal in each lens.

Here, as depicted in FIGS. 6A-6C, the planar contours of the optical zone 22 will vary according to the thickness dimension setting in the rear surface joint zone 34, and thus will not necessarily have similar shape across different lenses. Specifically, whereas in the lenses 10a, 10b, 10c of the preceding first embodiment for example, the optical zone 22 is of generally elliptical shape with the slope of the major axis of the ellipse varying among 180°, 90°, and 45° respectively, in the lenses 40a, 40b, 40c of the present embodiment the planar contours of the optical zone 22 in contact lenses 40a and 40c for example will be generally elliptical in shape with the slope of the major axis of the ellipse varying between 180° and 45°, while the planar contours of the optical zone 22 in contact lens 40b will be generally circular in shape centered on the lens center axis 12, rather than generally elliptical as in the contact lenses 40a and 40c.

In the contact lens 40 constructed in the above manner, regardless of the cylindrical axial angle setting, the thickness dimension of the rear surface joint zone 34 will be thinnest in angular directions of 0° and 180° and thickest in angular directions of 90° and 270°. By so doing, the optical zone 22 will be able to connect smoothly with a peripheral zone 24 that is thinner at top and bottom and thicker at left and right, so as to afford excellent wear comfort. At the same time, because the left and right regions of the optical zone 22 are thicker regardless of cylindrical axial angle setting, the action of gravity on the thick left and right regions of the peripheral zone 24 and the action of gravity on the left and right regions of the optical zone 22 will cooperate to afford better circumferential stabilizing effect. Thus, the contact lens 40 of the present embodiment is particularly well adapted for use in a contact lens provided with double slab-off design. The contact lens 40 of the present embodiment is more favorably employed in a contact lens with a cylindrical axial angle of 180°, which in the past was thicker at top and bottom and thinner at left and right.

In the contact lens series of the present embodiment, because thickness dimension of the rear surface joint zone 34 in the circumferential direction is standardized across all the lenses that make up a series, variability in wear comfort and circumferential stability due to differences in optical characteristics such as the cylindrical axial angle can be minimized, and the desired wear comfort and circumferential stability can be achieved consistently and with high accuracy regardless differences in optical characteristics.

It is possible for the contact lenses of the series of the present embodiment to be manufactured by a method substantially similar to the contact lens series manufacturing method of the preceding first embodiment. For example, in the manufacturing method described earlier, thickness dimension at angular directions ($\theta$) of 0° and 180° may be set to the smallest (thinnest) value in the circumferential direction, while setting thickness dimension at angular directions ($\theta$) of 90° and 270° to the largest (thickest) value in the circumferential direction as the desired thickness dimension of the rear surface optical zone 34 in order to obtain diameter dimensions (x$\theta$) of the rear surface optical zone 20 in these four directions; and diameter dimensions in the remaining angular directions then derived by an appropriate interpolation process to obtain diameter dimensions along the entire circumference of the optical zone 22.

While the present invention has been described above in terms of certain preferred embodiments, these are merely exemplary and the present invention should not be construed as limited in any way to the specific disclosure in the embodiments herein.

For example, the thickness dimension of the rear surface joint zone 34 and the circumferential distribution thereof in the preceding embodiments are merely exemplary and imply no limitation whatsoever. In yet another possible mode, in the manufacturing method discussed above the thickness dimension of the rear surface joint zone 34 may be made thinnest at the angular direction of 0° which represents the upper intersection point of a longitude line on the circumference of the optical zone 22, and thickest at the angular direction of 180° which represents the lower intersection point of the longitude line on the circumference of the optical zone 22, with thickness varying in 2$\pi$ periods smoothly connecting these locations. According to this manufacturing method, the upper part of the optical zone 22 can be thinner while its lower part can be thicker. Such an optical zone 22 can be used to good effect in a contact lens of prism ballast design having a prism formed in the lower part of the peripheral zone 24. Specifically, by making the lower part of the optical zone 22 thicker in addition to the lower part of the peripheral zone 24, the lower parts of the peripheral zone 24 and the optical zone 22 will cooperate and make it possible for a ballast effect to be produced more effectively, in turn making it possible to achieve better circumferential stability. Also, according to the present manufacturing method, it will be possible to produce such a profile with a high degree of accuracy and to form a thicker lower part with a higher degree of accuracy, particularly in a contact lens having a cylindrical axial angle of 90°, which in the prior art had thin upper and lower parts.

TABLE 3

| | BC = 8.60/Po = −3.00/<br>Ct = 0.08/<br>Cyl = −2.50/Ax180 | | | | BC = 8.60/Po = −3.00/<br>Ct = 0.08/Cyl = −2.50/Ax90 | | | | BC = 8.60/Po = −3.00/<br>Ct = 0.08/<br>Cyl = −2.50/Ax45 | | |
|---|---|---|---|---|---|---|---|---|---|---|---|
| $\theta$ (deg) | BC $\theta$ (mm) | x $\theta$ (mm) | JT $\theta$ (mm) | $\theta$ (deg) | BC $\theta$ (mm) | x $\theta$ (mm) | JT $\theta$ (mm) | $\theta$ (deg) | BC $\theta$ (mm) | x $\theta$ (mm) | JT $\theta$ (mm) |
| 0 | 8.184 | 3.29 | 0.150 | 0 | 8.600 | 4.49 | 0.150 | 0 | 8.387 | 3.76 | 0.150 |
| 10 | 8.196 | 3.32 | 0.150 | 10 | 8.587 | 4.43 | 0.150 | 10 | 8.459 | 3.97 | 0.150 |
| 20 | 8.231 | 3.39 | 0.150 | 20 | 8.549 | 4.28 | 0.150 | 20 | 8.523 | 4.18 | 0.150 |
| 30 | 8.284 | 3.50 | 0.150 | 30 | 8.492 | 4.08 | 0.150 | 30 | 8.571 | 4.37 | 0.150 |
| 40 | 8.351 | 3.66 | 0.150 | 40 | 8.423 | 3.86 | 0.150 | 40 | 8.597 | 4.48 | 0.150 |
| 50 | 8.423 | 3.86 | 0.150 | 50 | 8.351 | 3.66 | 0.150 | 50 | 8.597 | 4.48 | 0.150 |
| 60 | 8.492 | 4.08 | 0.150 | 60 | 8.284 | 3.50 | 0.150 | 60 | 8.571 | 4.37 | 0.150 |
| 70 | 8.549 | 4.28 | 0.150 | 70 | 8.231 | 3.39 | 0.150 | 70 | 8.523 | 4.18 | 0.150 |
| 80 | 8.587 | 4.43 | 0.150 | 80 | 8.198 | 3.32 | 0.150 | 80 | 8.459 | 3.97 | 0.150 |
| 90 | 8.600 | 4.49 | 0.150 | 90 | 8.184 | 3.29 | 0.150 | 90 | 8.387 | 3.76 | 0.150 |
| 100 | 8.587 | 4.43 | 0.150 | 100 | 8.196 | 3.32 | 0.150 | 100 | 8.316 | 3.58 | 0.150 |
| 110 | 8.549 | 4.28 | 0.150 | 110 | 8.231 | 3.39 | 0.150 | 110 | 8.255 | 3.44 | 0.150 |
| 120 | 8.492 | 4.08 | 0.150 | 120 | 8.284 | 3.50 | 0.150 | 120 | 8.211 | 3.35 | 0.150 |
| 130 | 8.423 | 3.86 | 0.150 | 130 | 8.351 | 3.66 | 0.150 | 130 | 8.187 | 3.30 | 0.150 |
| 140 | 8.351 | 3.66 | 0.150 | 140 | 8.423 | 3.86 | 0.150 | 140 | 8.187 | 3.30 | 0.150 |
| 150 | 8.284 | 3.50 | 0.150 | 150 | 8.492 | 4.08 | 0.150 | 150 | 8.211 | 3.35 | 0.150 |
| 160 | 8.231 | 3.39 | 0.150 | 160 | 8.549 | 4.28 | 0.150 | 160 | 8.255 | 3.44 | 0.150 |
| 170 | 8.196 | 3.32 | 0.150 | 170 | 8.587 | 4.43 | 0.150 | 170 | 8.316 | 3.58 | 0.150 |
| 180 | 8.184 | 3.29 | 0.150 | 180 | 8.600 | 4.49 | 0.150 | 180 | 8.387 | 3.76 | 0.150 |
| 190 | 8.196 | 3.32 | 0.150 | 190 | 8.587 | 4.43 | 0.150 | 190 | 8.459 | 3.97 | 0.150 |
| 200 | 8.231 | 3.39 | 0.150 | 200 | 8.549 | 4.28 | 0.150 | 200 | 8.523 | 4.18 | 0.150 |
| 210 | 8.284 | 3.50 | 0.150 | 210 | 8.492 | 4.08 | 0.150 | 210 | 8.571 | 4.37 | 0.150 |
| 220 | 8.351 | 3.66 | 0.150 | 220 | 8.423 | 3.86 | 0.150 | 220 | 8.597 | 4.46 | 0.150 |
| 230 | 8.423 | 3.86 | 0.150 | 230 | 8.351 | 3.66 | 0.150 | 230 | 8.597 | 4.48 | 0.150 |
| 240 | 8.492 | 4.08 | 0.150 | 240 | 8.284 | 3.50 | 0.150 | 240 | 8.571 | 4.37 | 0.150 |
| 250 | 8.549 | 4.28 | 0.150 | 250 | 8.231 | 3.39 | 0.150 | 250 | 8.523 | 4.18 | 0.150 |
| 260 | 8.587 | 4.43 | 0.150 | 260 | 8.196 | 3.32 | 0.150 | 260 | 8.459 | 3.97 | 0.150 |

TABLE 3-continued

| θ (deg) | BC = 8.60/Po = −3.00/ Ct = 0.08/ Cyl = −2.50/Ax180 | | | θ (deg) | BC = 8.60/Po = −3.00/ Ct = 0.08/Cyl = −2.50/Ax90 | | | θ (deg) | BC = 8.60/Po = −3.00/ Ct = 0.08/ Cyl = −2.50/Ax45 | | |
|---|---|---|---|---|---|---|---|---|---|---|---|
| | BC θ (mm) | x θ (mm) | JT θ (mm) | | BC θ (mm) | x θ (mm) | JT θ (mm) | | BC θ (mm) | x θ (mm) | JT θ (mm) |
| 270 | 8.600 | 4.49 | 0.150 | 270 | 8.184 | 3.29 | 0.150 | 270 | 8.387 | 3.76 | 0.150 |
| 280 | 8.587 | 4.43 | 0.150 | 280 | 8.196 | 3.32 | 0.150 | 280 | 8.315 | 3.58 | 0.150 |
| 290 | 8.549 | 4.28 | 0.150 | 290 | 8.231 | 3.39 | 0.150 | 290 | 8.255 | 3.44 | 0.150 |
| 300 | 8.492 | 4.08 | 0.150 | 300 | 8.284 | 3.50 | 0.150 | 300 | 8.211 | 3.35 | 0.150 |
| 310 | 8.423 | 3.86 | 0.150 | 310 | 8.351 | 3.66 | 0.150 | 310 | 8.187 | 3.30 | 0.150 |
| 320 | 8.351 | 3.66 | 0.150 | 320 | 8.423 | 3.86 | 0.150 | 320 | 8.187 | 3.30 | 0.150 |
| 330 | 8.284 | 3.50 | 0.150 | 330 | 8.492 | 4.08 | 0.150 | 330 | 8.211 | 3.35 | 0.150 |
| 340 | 8.231 | 3.39 | 0.150 | 340 | 8.549 | 4.28 | 0.150 | 340 | 8.255 | 3.44 | 0.150 |
| 350 | 8.196 | 3.32 | 0.150 | 350 | 8.587 | 4.43 | 0.150 | 350 | 8.316 | 3.58 | 0.150 |
| 360 | 8.184 | 3.29 | 0.150 | 360 | 8.600 | 4.49 | 0.150 | 360 | 8.387 | 3.76 | 0.150 |

TABLE 4

| θ (deg) | BC = 8.60/Po = −3.00/ Ct = 0.08/ Cyl = −3.75/Ax180 | | | θ (deg) | BC = 8.60/Po = −3.00/ Ct = 0.08/Cyl = −3.75/Ax90 | | | θ (deg) | BC = 8.60/Po = −3.00/ Ct = 0.08/ Cyl = −3.75/Ax45 | | |
|---|---|---|---|---|---|---|---|---|---|---|---|
| | BC θ (mm) | x θ (mm) | JT θ (mm) | | BC θ (mm) | x θ (mm) | JT θ (mm) | | BC θ (mm) | x θ (mm) | JT θ (mm) |
| 0 | 7.991 | 2.97 | 0.150 | 0 | 8.600 | 4.49 | 0.150 | 0 | 8.284 | 3.50 | 0.150 |
| 10 | 8.008 | 2.99 | 0.150 | 10 | 8.580 | 4.41 | 0.150 | 10 | 8.390 | 3.76 | 0.150 |
| 20 | 8.058 | 3.07 | 0.150 | 20 | 8.524 | 4.19 | 0.150 | 20 | 8.484 | 4.05 | 0.150 |
| 30 | 8.135 | 3.20 | 0.150 | 30 | 8.439 | 3.91 | 0.150 | 30 | 8.556 | 4.31 | 0.150 |
| 40 | 8.232 | 3.39 | 0.150 | 40 | 8.337 | 3.63 | 0.150 | 40 | 8.595 | 4.47 | 0.150 |
| 50 | 8.337 | 3.63 | 0.150 | 50 | 8.232 | 3.39 | 0.150 | 50 | 8.595 | 4.47 | 0.150 |
| 60 | 8.439 | 3.91 | 0.150 | 60 | 8.135 | 3.20 | 0.150 | 60 | 8.556 | 4.31 | 0.150 |
| 70 | 8.524 | 4.19 | 0.150 | 70 | 8.058 | 3.07 | 0.150 | 70 | 8.484 | 4.05 | 0.150 |
| 80 | 8.580 | 4.41 | 0.150 | 80 | 8.008 | 2.99 | 0.150 | 80 | 8.390 | 3.76 | 0.150 |
| 90 | 8.600 | 4.49 | 0.150 | 90 | 7.991 | 2.97 | 0.150 | 90 | 8.284 | 3.50 | 0.150 |
| 100 | 8.580 | 4.41 | 0.150 | 100 | 8.008 | 2.99 | 0.150 | 100 | 8.181 | 3.29 | 0.150 |
| 110 | 8.524 | 4.19 | 0.150 | 110 | 8.058 | 3.07 | 0.150 | 110 | 8.093 | 3.13 | 0.150 |
| 120 | 8.439 | 3.91 | 0.150 | 120 | 8.135 | 3.20 | 0.150 | 120 | 8.029 | 3.03 | 0.150 |
| 130 | 8.337 | 3.63 | 0.150 | 130 | 8.232 | 3.39 | 0.150 | 130 | 7.995 | 2.97 | 0.150 |
| 140 | 8.232 | 3.39 | 0.150 | 140 | 8.337 | 3.63 | 0.150 | 140 | 7.995 | 2.97 | 0.150 |
| 150 | 8.135 | 3.20 | 0.150 | 150 | 8.439 | 3.91 | 0.150 | 150 | 8.029 | 3.03 | 0.150 |
| 160 | 8.058 | 3.07 | 0.150 | 160 | 8.524 | 4.19 | 0.150 | 160 | 8.093 | 3.13 | 0.150 |
| 170 | 8.008 | 2.99 | 0.150 | 170 | 8.580 | 4.41 | 0.150 | 170 | 8.181 | 3.29 | 0.150 |
| 180 | 7.991 | 2.97 | 0.150 | 180 | 8.600 | 4.49 | 0.150 | 180 | 8.284 | 3.50 | 0.150 |
| 190 | 8.008 | 2.99 | 0.150 | 190 | 8.580 | 4.41 | 0.150 | 190 | 8.390 | 3.76 | 0.150 |
| 200 | 8.058 | 3.07 | 0.150 | 200 | 8.524 | 4.19 | 0.150 | 200 | 8.484 | 4.05 | 0.150 |
| 210 | 8.135 | 3.20 | 0.150 | 210 | 8.439 | 3.91 | 0.150 | 210 | 8.556 | 4.31 | 0.150 |
| 220 | 8.232 | 3.39 | 0.150 | 220 | 8.337 | 3.63 | 0.150 | 220 | 8.595 | 4.47 | 0.150 |
| 230 | 8.337 | 3.63 | 0.150 | 230 | 8.232 | 3.39 | 0.150 | 230 | 8.595 | 4.47 | 0.150 |
| 240 | 8.439 | 3.91 | 0.150 | 240 | 8.135 | 3.20 | 0.150 | 240 | 8.556 | 4.31 | 0.150 |
| 250 | 8.524 | 4.19 | 0.150 | 250 | 8.058 | 3.07 | 0.150 | 250 | 8.484 | 4.05 | 0.150 |
| 260 | 8.580 | 4.41 | 0.150 | 260 | 8.008 | 2.99 | 0.150 | 260 | 8.390 | 3.76 | 0.150 |
| 270 | 8.600 | 4.49 | 0.150 | 270 | 7.991 | 2.97 | 0.150 | 270 | 8.284 | 3.50 | 0.150 |
| 280 | 8.580 | 4.41 | 0.150 | 280 | 8.008 | 2.99 | 0.150 | 280 | 8.181 | 3.29 | 0.150 |
| 290 | 8.524 | 4.19 | 0.150 | 290 | 8.058 | 3.07 | 0.150 | 290 | 8.093 | 3.13 | 0.150 |
| 300 | 8.439 | 3.91 | 0.150 | 300 | 8.135 | 3.20 | 0.150 | 300 | 8.029 | 3.03 | 0.150 |
| 310 | 8.337 | 3.63 | 0.150 | 310 | 8.232 | 3.39 | 0.150 | 310 | 7.995 | 2.97 | 0.150 |
| 320 | 8.232 | 3.39 | 0.150 | 320 | 8.337 | 3.63 | 0.150 | 320 | 7.995 | 2.97 | 0.150 |
| 330 | 8.135 | 3.20 | 0.150 | 330 | 8.439 | 3.91 | 0.150 | 330 | 8.029 | 3.03 | 0.150 |
| 340 | 8.058 | 3.07 | 0.150 | 340 | 8.524 | 4.19 | 0.150 | 340 | 8.093 | 3.13 | 0.150 |
| 350 | 8.008 | 2.99 | 0.150 | 350 | 8.580 | 4.41 | 0.150 | 350 | 8.181 | 3.29 | 0.150 |
| 360 | 7.991 | 2.97 | 0.150 | 360 | 8.600 | 4.49 | 0.150 | 360 | 8.284 | 3.50 | 0.150 |

In the preceding embodiments, the lens series is composed of lenses of given cylindrical power but different cylindrical axial angles; however, the series could instead be composed of lenses whose cylindrical power differs instead of or in addition to cylindrical axial angle. For example, in addition to the lens series in the preceding first embodiment shown in Table 1, the lenses shown in Tables 3 and 4 could be added to make up a single series that includes all of the lenses shown in these Tables 1, 3, and 4. Here, the lens series shown in Tables 3 and 4 includes the contact lenses 10 in the preceding first embodiment shown in Table 1 but with differing cylindrical power; in the lens series shown in Table 3, cylindrical power (Cly)=−2.50 D, while in the lens series shown in Table 4, cylindrical power (Cly)=−3.75 D. Like the contact lenses 10 in the preceding first embodiment, each of the lenses in Tables 3 and 4 has thickness dimension (JTθ) that is constant about the entire circumference of the rear surface joint zone 34, namely, an identical value of 0.150 mm for all of lenses in Tables 1, 3, and 4. Accordingly, the contact lenses in Tables 1, 3, and 4 will each have constant thickness dimension about the entire circumference of the rear surface joint zone 34; and the thickness dimension of the rear surface joint zone 34 will be the same even among lenses that differ in cylindrical power and cylindrical axial angle.

By so doing it is possible to produce a contact lens series made up of lenses whose cylindrical power, in addition to the cylindrical axial angle, has been established in multiple steps. According to the manufacturing method of the present invention, since thickness dimension of the rear surface joint zone 34 can be established with a high degree of accuracy and made equal for all lenses including those of differing cylindrical power, variability of wear comfort and circumferential stability due to differing cylindrical power can be minimized, and the desired wear comfort and circumferential stability can be afforded at any cylindrical power. However, if the differences in cylindrical power are too great it will be difficult to establish a constant value for thickness dimension in the rear surface joint zone 34. Accordingly, the preferred difference interval for cylindrical power in terms of obtaining uniform thickness dimension in the rear surface joint zone 34 will be established within a range of 3 D, more preferably within a range of 2.5 D.

Where spherical diopter power (P) differs, the curvature ratio of the front surface optical zone will vary, and the thickness dimension of the optical zone will vary as well. For example, if the spherical diopter power is a large value on the minus diopter side, typically, where a given junction thickness has been established, the location of the joint zone will lie further towards the inward side and the diameter dimension of the optical zone will be progressively smaller. Consequently, where spherical diopter power differs, it will be necessary to again calculate diameter dimensions of the optical zone that will satisfy the desired thickness dimension at the spherical diopter power in question; however, because diameter dimensions of the optical zone vary in substantially uniform fashion along the entire circumference according to variation in spherical diopter power, rather than recalculating diameter dimensions of the optical zone in accordance with the manufacturing method described above, it would be possible to instead calculate a rate of change in diameter dimensions of the optical zone in prescribed angular direction, and to then calculate the diameter dimensions of the optical zone in other angular directions based on this rate of change, for example.

Additionally, whereas in the preceding embodiments the position of the joint zone affording the desired thickness dimension in the rear surface joint zone on the rear surface of the lens was calculated in terms of diameter dimension for the rear surface optical zone, the present invention may be implemented for the front surface optical zone as well, and by designating the front surface joint zone as the joint zone it would be possible to derive the position of the joint zone in terms of the diameter dimension of the front surface optical zone. Specifically, by defining a toric face that will impart the desired cylindrical power and cylindrical axial angle to the front surface optical zone, and establishing a radius of curvature that will impart the desired spherical diopter power to the rear surface optical zone, the front surface optical zone may be afforded an optical zone profile that defines a toric face. As in the preceding embodiments, the profile of the optical zone can be calculated by a ray tracing algorithm or the like. Once optical zone thickness has been derived in this way, diameter dimensions of the front surface optical zone that will afford the desired thickness dimension of the front surface joint zone can be derived on the basis of thickness variation of the optical zone in a manner analogous to the preceding embodiments. It is additionally possible to employ the present invention for both the front surface optical zone and the rear surface optical zone, to respectively determine diameter dimensions for the front surface optical zone and diameter dimensions for the rear surface optical zone.

It is additionally possible for the present invention to be implemented in a contact lens endowed with bifocal spherical diopter power affording two focal points in the optical zone, or with multifocal spherical diopter power affording multiple focal points; and with a high degree of accuracy to establish thickness dimensions in the joint zone lying between the peripheral zone and the optical zone endowed with such spherical diopter power. Where contact lens affording such spherical diopter power is manufactured by the manufacturing method of the present invention, after first designing the profiles of the front surface optical zone and the rear surface optical zone in accordance with appropriate conventional known methods such as a ray tracing algorithm to impart the optical zones with bifocal spherical diopter power or multifocal spherical diopter power, the diameter dimensions of the optical zone that will afford the desired thickness dimension of the joint zone can then be derived on the basis of variation in thickness of the optical zone in a manner analogous to the preceding embodiments.

In the preceding first and second embodiments, the junction thickness of the joint zone was standardized to given thickness dimension along the entire circumference of the joint zone in all of the contact lenses that make up a series, but it is not essential for the junction thickness to be standardized in all angular directions along the entire circumference. For example, the junction thickness could be standardized in an appropriate number of angular directions, for example 0°, 90°, 180°, and 270°, while allowing a modicum of error in the junction thickness in angular directions lying between these.

It is also to be understood that the present invention may be embodied with various other changes, modifications and improvements, which may occur to those skilled in the art, without departing from the spirit and scope of the invention defined in the following claims.

The invention claimed is:

1. A method of manufacturing a contact lens including the steps of: providing an optical zone in a center part of the lens; providing a peripheral zone surrounding the optical zone; providing a rear surface optical zone with a concave shape that substantially matches a surface profile of a cornea while providing a front surface optical zone with a convex shape adapted to provide a required spherical diopter power and geometrical center thickness; and designing a face of either the front surface optical zone or the rear surface optical zone so as to impart thereto cylindrical power and axial angle necessary for a toric surface; comprising further steps of:

establishing on the rear surface optical zone a base rear surface profile of concave shape that substantially matches a surface profile of the cornea and a geometrical center thickness of the contact lens;

establishing on the front surface optical zone a base front surface profile of convex shape in view of the base rear surface profile and to the required spherical diopter power and geometrical center thickness;

selecting a number of angular directions ($\theta$) about the geometrical center axis of the optical zone, and establishing a radius of curvature of the rear surface optical zone in each of the angular directions ($\theta$) so as to give a desired cylindrical power and cylindrical axial angle;

establishing at least one desired junction thickness in a joint zone that connects the optical zone with the peripheral zone at desired multiple sites along multiple diametrical axes about the geometrical center axis of the optical zone, and deriving multiple diametrical positions of the joint zone that will impart the junction thickness along multiple diametrical axes about the geometrical center axis of the optical zone; and establishing positions of the joint zone between the multiple diametrical positions in the circumferential direction through an interpolation process so as to derive along the entire circumference of the lens a radius of the optical zone that satisfies the desired junction thickness.

2. The method of manufacturing a contact lens according to claim 1, wherein the junction thickness is established at a minimum of four sites situated at intersection points of latitude lines and longitude lines on the circumference about the geometrical center axis of the optical zone.

3. The method of manufacturing a contact lens according to claim 1, wherein the junction thickness is constant about the entire circumference of the joint zone.

4. The method of manufacturing a contact lens according to claim 1, wherein the junction thickness is established such that maximum thickness is reached at two points of intersection with a latitude line and minimum thickness is reached at two points of intersection with a longitude line, on the circumference about the geometrical center axis of the optical zone.

5. The method of manufacturing a contact lens according to claim 1, wherein the junction thickness is established such that minimum thickness is reached at an upper side point of intersection with a longitude line and maximum thickness is reached at a lower side point of intersection with a longitude line, on the circumference about the geometrical center axis of the optical zone.

6. The method of manufacturing a contact lens according to claim 1, wherein the spherical diopter power required in the optical zone is either a monofocal spherical diopter power, a bifocal spherical diopter power, or a multifocal spherical diopter power.

\* \* \* \* \*